Aug. 6, 1968  R. A. BUB  3,395,514
FILTER TESTING SYSTEM AND METHOD
Filed Oct. 27, 1965
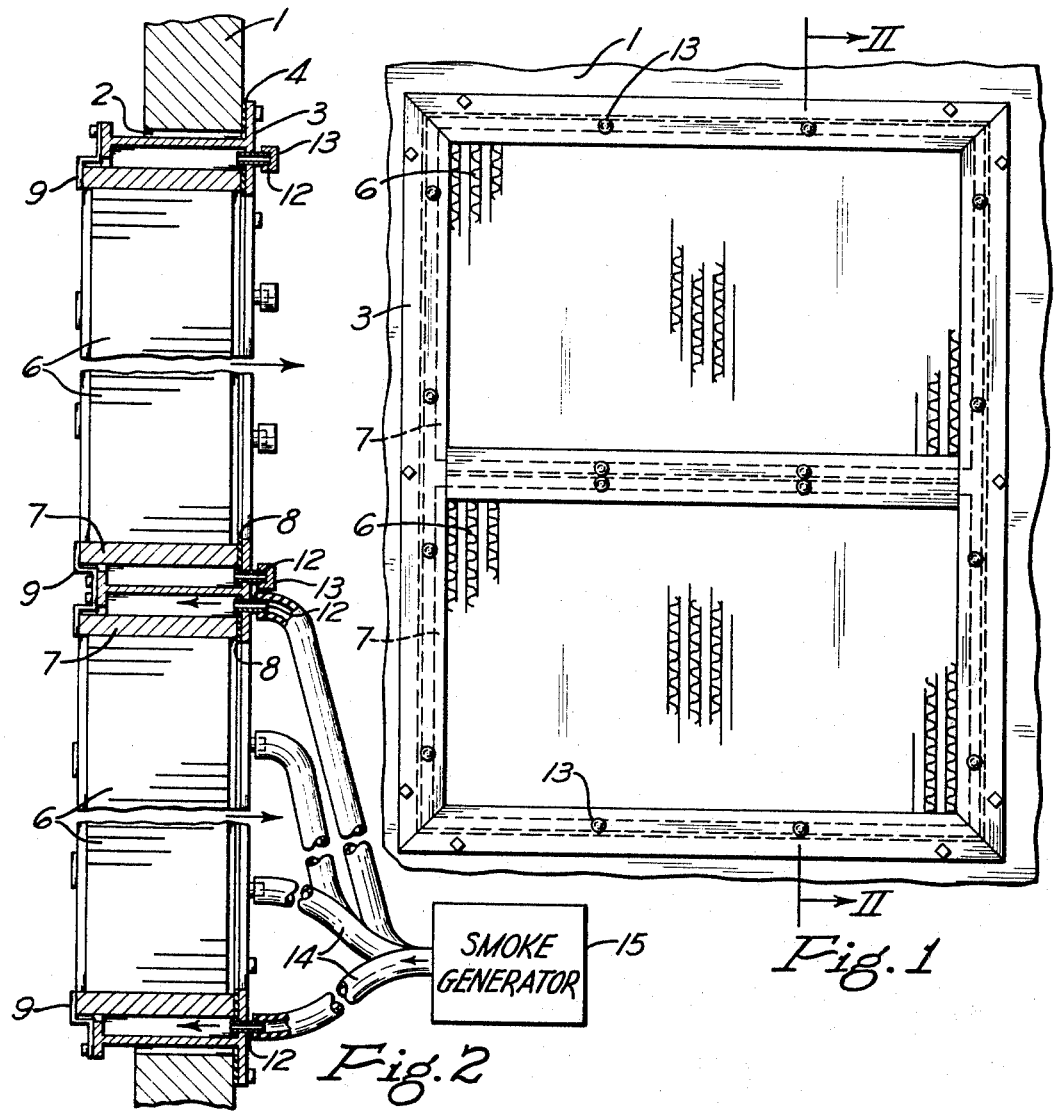
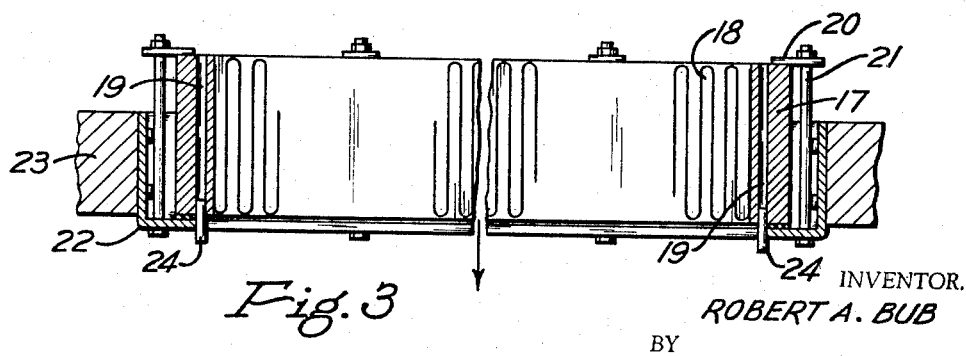
INVENTOR.
ROBERT A. BUB
BY
Brown, Critchlow, Flick & Peckham.
ATTORNEYS.

United States Patent Office 3,395,514
Patented Aug. 6, 1968

3,395,514
FILTER TESTING SYSTEM AND METHOD
Robert A. Bub, Gibsonia, Pa., assignor to Mine Safety
Appliances Company, a corporation of Pennsylvania
Filed Oct. 27, 1965, Ser. No. 505,364
5 Claims. (Cl. 55—97)

ABSTRACT OF THE DISCLOSURE

A leak testing fluid is compelled to flow past a body of filtering material in a direction counter to the flow of the fluid being filtered by that material. As a result, if there are any leaks around the body of filtering material through which the filterable fluid can flow, it will carry with it the leak testing fluid which then can be detected at the downstream end of the filter to show that leaks are present.

---

The efficiency of filtering apparatus depends on the efficiency of the filtering material, the sealing of the material in the frames, and the correct installation of the frames in the retaining members. When a bank of filters is used, each filter can be tested independently, but a check of the entire system is necessary in order to be sure of a satisfactory job. In fact, many "white room" and laminar air flow benches now require checking of the entire filter system before customer acceptance. In such cases a testing fluid, such as smoke, is introduced upstream of the filter bank and then the installation is probed for leakage at all joints and at the filters themselves. In the case of a relatively small system, the test aerosol can be fed into the blower for the fluid that is being filtered so that the upstream plenum will be flooded with the aerosol while the probe testing is being conducted. This also can be done with larger systems, but the long exposure to the test fluid that is necessary for the tedious complete probing that is required has a detrimental effect on the filtering material and the system. A long exposure loads the filters with smoke or the like and thus reduces their life and the general economics of the installation. With some test smokes, such as dioctyl phthalate, a long exposure reduces the efficiency of the filtering material and the system.

It is among the objects of this invention to provide for filter testing which can be quickly conducted in any desired limited area of a large installation, which does not cause deterioration of the total system, which permits the installation to be spot checked at various times throughout its life, and which permits the inspector and the aerosol generator and the detection equipment all to be located at the downstream or clean side of the installation.

In accordance with this invention, filtering material is sealed in a frame, the downstream end of which is sealed against surrounding retaining means. The frame or retaining means, or both, is provided with passages that connect the downstream end of the apparatus with its upstream end. Normally, these passages are closed, but when they are opened a testing fluid can be forced upstream through them while the fluid that the apparatus is designed to filter is flowing downstream through the filtering material. The testing fluid therefore will be carried downstream through any leaks in the apparatus and, issuing from such leaks, can be detected by suitable equipment.

The invention is illustrated in the accompanying drawings, in which:

FIG. 1 is a view of the downstream end of my filtering apparatus installed in operating position;

FIG. 2 is an enlarged vertical section taken on the line II—II of FIG. 1 showing the lower filter being tested; and FIG. 3 is a horizontal section through a modification.

Referring to FIGS. 1 and 2 of the drawings, a wall 1 of a room or duct is provided with an opening 2, through which fluid (air for example) to be filtered is caused to flow in one direction. In this opening there is filter-retaining means, generally in the form of a frame-like metal retaining member 3, the marginal portion of which is securely attached to the wall around the opening. The joint between them is sealed by a gasket 4 or by sealing compound.

The retaining member may be of a size and construction to receive and support one or more filters, each of which consists of a body 6 of any suitable filtering material sealed in a surrounding frame 7. The front or downstream end of the frame is sealed against the retaining member by pressing the frame against a gasket 8 between it and the retaining member. Pressure can be applied to the filter frame for this purpose in any suitable manner, such as by clips 9 engaging its upstream end and bolted to the back of the retaining member. Obviously, these clips also hold the filter in place.

The above description speaks of the different joints in this filtering apparatus as being sealed, which is the intention and which ostensibly occurs. However, in actual practice the seals cannot be depended upon and therefore it is necessary to check the apparatus after it has been installed in order to see whether there are any leaks. It is also possible that filters may be damaged in shipping, storage or installation, and that the damage cannot be detected visually. Even if there are no leaks in the beginning, they may develop later and it is important to discover them. Accordingly, it is a feature of this invention that the filtering apparatus is constructed in such a manner that any filter in a group can be tested for leaks independently of other filters in the group. For this purpose, the retaining member 3 is provided around each filter frame with passages that connect the downstream end of the apparatus with the space behind it. These passages may be formed merely by holes in the front of the retaining member, but more suitably by short tubes 12 mounted in such holes. Normally these tubes are closed by plugs or caps 13 so that nothing can leak through them, but when it is desired to test a filter the surrounding passages are opened by removing the caps. As shown in FIG. 2, hoses 14 are then connected to the projecting front ends of the tubes, and a suitable testing fluid, which is different from the fluid being filtered, is forced through the hoses and tubes against the pressure of the air that is flowing through the filter and being filtered by it. One suitable testing fluid is smoke, which may be forced into the hoses by a suitable smoke generator 15 or other device. The air being filtered will carry the smoke downstream with it through any leaks in the filter or in the joints between the retaining member and the filter or the surrounding wall. The smoke issuing from any such leaks can be detected in a well-known manner by conventional smoke detection equipment.

When the frame 17 of a filter 18 is thick enough, as shown in FIG. 3, it may be desirable to form the passages 19 for the testing fluid in the frame itself. This frame is shown held in place by lugs 20 mounted on the threaded rear ends of rods 21 extending rearwardly from a retaining member 22 surrounding the frame and secured to the wall 23 of an opening. The front or downstream ends of the passages normally will be closed by removable plugs 24 or the like. The testing procedure with this filtering apparatus is the same as that previously described herein.

It will be seen that with the apparatus disclosed herein all the testing can be done from the downstream or clean end of the filters and as often as desired. Furthermore, limited areas of the apparatus can be tested by delivering the testing fluid only to the passages in those areas. This prevents other parts of the filters from being contaminated by the testing fluid.

According to the provisions of the patent statutes, I have explained the principle of my invention and have illustrated and described what I now consider to represent its best embodiment.

I claim:

1. That method of leak testing a filter in which filtering material for a filterable fluid is sealed in a frame having a downstream end and which is sealed against surrounding retaining means, said method comprising forcing a leak testing fluid upstream between said retaining means and filtering material while a filterable fluid different from the testing fluid is flowing downstream through the filtering material and any leaks around it, whereby said testing fluid will be carried downstream by the filterable fluid through any leaks for detection at the downstream end of the filter.

2. Filtering apparatus comprising a body of fluid-filtering material having upstream and downstream ends, a frame member surrounding said body and sealed thereto, a retaining member surrounding said body, means sealing said frame member against said retaining member, one of said members being provided with passages for leak testing fluid connecting the downstream end of the apparatus with its upstream end, the inlets of said passages being at said downstream end, and removable means normally closing the passages; whereby when said passages are opened and a leak testing fluid is forced upstream through them while a filterable fluid is flowing downstream through said filtering body and any leaks around it, the testing fluid issuing from the upstream ends of the passages will be carried downstream by the filterable fluid through any leaks in the apparatus for detection at its downstream end.

3. Filtering apparatus according to claim 2, in which said frame member is provided with said passages.

4. Filtering apparatus according to claim 2, in which said retaining member is provided with said passages outwardly of the frame member.

5. Filtering apparatus comprising a body of fluid-filtering material having upstream and downstream ends, a frame member surrounding said body and sealed thereto, a retaining member surrounding said body, means sealing said frame member against said retaining member, one of said members being provided with passages connecting the downstream end of the apparatus with its upstream end, and means connected with said passages at said downstream end for forcing a leak testing fluid upstream through them while a filterable fluid is flowing downstream through said filtering body and any leaks around it; whereby the testing fluid leaving the upstream ends of said passages will be carried downstream by the filterable fluid through any leaks in the apparatus for detection at its downstream end.

References Cited

UNITED STATES PATENTS

| | | | |
|---|---|---|---|
| 792,000 | 6/1905 | Brady | 73—40.5 |
| 1,049,789 | 1/1913 | Williamson | 55—484 |
| 2,055,774 | 9/1936 | Ray | 55—484 |
| 2,638,688 | 5/1953 | Hazelton | 55—270 |
| 2,790,253 | 4/1957 | Ayer | 73—38 |
| 3,144,315 | 8/1964 | Hunn | 55—274 |
| 3,194,056 | 7/1965 | Hopkins et al. | 73—38 |
| 3,250,063 | 5/1966 | Andrews | 55—504 |
| 3,280,538 | 10/1966 | Schwarz | 55—502 |
| 3,280,540 | 10/1966 | Soltis | 55—504 |

HARRY B. THORNTON, *Primary Examiner.*

B. NOZICK, *Assistant Examiner.*